United States Patent
Park et al.

(10) Patent No.: US 8,953,131 B2
(45) Date of Patent: Feb. 10, 2015

(54) TOUCH SENSOR (71) Applicant: Samsung Electro-Mechanics Co., Ltd., Suwon (KR)

(72) Inventors: Jang Ho Park, Suwon (KR); Jung Ryoul Yim, Suwon (KR); In Hyun Jang, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 157 days.

(21) Appl. No.: 13/786,341

(22) Filed: Mar. 5, 2013

(65) Prior Publication Data
US 2014/0174200 A1 Jun. 26, 2014

(30) Foreign Application Priority Data
Dec. 24, 2012 (KR) .................. 10-2012-0152391

(51) Int. Cl.
*G06F 3/041* (2006.01)
*G06F 3/045* (2006.01)
*G02F 1/1343* (2006.01)
*G01L 1/00* (2006.01)
*G06F 3/044* (2006.01)

(52) U.S. Cl.
CPC .............. *G01L 1/005* (2013.01); *G06F 3/044* (2013.01); *G06F 2203/04112* (2013.01)

USPC .......... 349/139; 349/143; 349/147; 345/173; 345/174

(58) Field of Classification Search
USPC ............. 345/173–174; 349/139, 147, 143, 12
See application file for complete search history.

(56) References Cited

U.S. PATENT DOCUMENTS

| 8,673,428 | B2 * | 3/2014 | Naoyuki et al. | 428/172 |
|---|---|---|---|---|
| 2009/0219258 | A1 * | 9/2009 | Geaghan et al. | 345/173 |
| 2010/0294536 | A1 * | 11/2010 | Usami | 174/126.1 |
| 2012/0017433 | A1 * | 1/2012 | Chung et al. | 29/829 |
| 2013/0120287 | A1 * | 5/2013 | Oh et al. | 345/173 |
| 2013/0169548 | A1 * | 7/2013 | Kim et al. | 345/173 |
| 2013/0269991 | A1 * | 10/2013 | Kim et al. | 174/257 |
| 2013/0277194 | A1 * | 10/2013 | Kim et al. | 200/600 |

FOREIGN PATENT DOCUMENTS

JP 2012-108844 6/2012

* cited by examiner

*Primary Examiner* — Lisa Caputo
*Assistant Examiner* — Jonathan Dunlap
(74) *Attorney, Agent, or Firm* — Ladas & Parry, LLP (57) ABSTRACT

The touch sensor according to a preferred embodiment of the present invention includes: a transparent substrate; and an electrode formed on the transparent substrate in a mesh pattern, wherein the electrode has a line width of one side smaller than that of the other side in a thickness direction.

20 Claims, 5 Drawing Sheets

TOUCH SENSOR

CROSS REFERENCE TO RELATED APPLICATION

This application claims the benefit of Korean Patent Application No. 10-2012-0152391, filed on Dec. 24, 2012, entitled "Touch Sensor" which is hereby incorporated by reference in its entirety into this application.

BACKGROUND OF THE INVENTION

1. Technical Field

The present invention relates to a touch sensor.

2. Description of the Related Art

In accordance with the growth of computers using a digital technology, devices assisting computers have also been developed, and personal computers, portable transmitters and other personal information processors execute processing of text and graphics using a variety of input devices such as a keyboard and a mouse.

While the rapid advancement of an information-oriented society has widened the use of computers more and more, it is difficult to efficiently operate products using only a keyboard and a mouse currently serving as an input device. Therefore, the necessity for a device that is simple, has minimum malfunction, and is capable of easily inputting information has increased.

In addition, current techniques for input devices have progressed toward techniques related to high reliability, durability, innovation, designing and processing beyond the level of satisfying general functions. To this end, a touch sensor (touch panel) has been developed as an input device capable of inputting information such as text, graphics, or the like.

This touch sensor is mounted on a display surface of an image display device such as an electronic organizer, a flat panel display device including a liquid crystal display (LCD) device, a plasma display panel (PDP), an electroluminescence (El) element, or the like, and a cathode ray tube (CRT) to thereby be used to allow a user to select desired information while viewing the image display device.

Meanwhile, the touch sensor is classified into a resistive type, a capacitive type, an electromagnetic type, a surface acoustic wave (SAW) type, and an infrared type. These various types of touch sensors are adapted for electronic products in consideration of a signal amplification problem, a resolution difference, a level of difficulty of designing and processing technologies, optical characteristics, electrical characteristics, mechanical characteristics, resistance to an environment, input characteristics, durability, and economic efficiency. Currently, the resistive type touch sensor and the capacitive type touch sensor have been used in a wide range of fields.

At present, as the capacitive type touch sensor, the touch sensor using an indium-tin oxide (ITO) or conductive polymer metal and a metal mesh electrode has been used. However, the touch sensor using the metal mesh electrode makes patterns look visible, and therefore visibility may be degraded.

PRIOR ART DOCUMENT

Patent Document

[Patent Document 1] Japanese Patent Laid-Open Publication No. 2012-108844

SUMMARY OF THE INVENTION

The present invention has been made in an effort to provide a touch sensor including an electrode with improved visibility.

Further, the present invention has been made in an effort to provide a touch sensor with high transmittance by reducing a thickness of one side of an electrode in a thickness direction of an electrode.

According to a preferred embodiment of the present invention, there is provided a touch sensor, including: a transparent substrate; and an electrode formed on the transparent substrate in a mesh pattern, wherein the electrode has a line width of one side smaller than that of the other side in a thickness direction.

The electrode may have the line width of one side 85% smaller than that of the other side.

The electrode may have both ends of one side or the other side that are depressed in a line width direction.

The electrode may have a reduced line width as being away from the transparent substrate.

The electrode may be formed of two layers and have the line width of any one layer 85% smaller than that of another layer.

The electrode may be formed of three layers and have the line width of a central layer smaller than that of the upper and lower layers.

The electrode may have the line width of the central layer 85% smaller than that of the upper and lower layers.

The electrode may be formed of three layers and have the line width of the upper and lower layers smaller than that of the central layer.

The electrode may have the line width of the upper and lower layers 85% smaller than that of the central layer.

A thickness of the electrode may be 20 to 90% of a line width.

The electrode may be formed on at least any one of one surface or the other surface of the transparent substrate by plating or deposition.

The electrode may be formed of metal silver formed by exposing/developing a silver salt emulsion layer.

The electrode may be formed of at least any one of copper (Cu), aluminum (Al), gold (Au), silver (Ag), titanium (Ti), molybdenum (Mo), nickel (Ni), and chromium (Cr).

The electrode may be formed of three layers and the central layer may be formed of at least any one of copper (Cu) and aluminum (Al).

The electrode may be formed of three layers and the upper and lower layers may be formed of at least any one of titanium (Ti), nickel (Ni), molybdenum (Mo), and chromium (Cr).

The electrode may be formed of three layers, the upper and lower layers may be formed of the same material, and the central layer may be formed of materials different from the upper and lower layers.

The electrode may have the line width of one side smaller than that of the other side by etching.

The touch sensor may further include: a dummy pattern formed between the electrodes in a mesh pattern.

The touch sensor may further include: an insulating portion forming a space between the electrode and the dummy pattern.

The electrode and the dummy pattern may have ends facing each other that are each provided with an inclined portion of which the length has reduced toward the upper part, the lower part, or the central part.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first," "second," "one side," "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention are described in detail with reference to the accompanying drawings.

Figure 1:
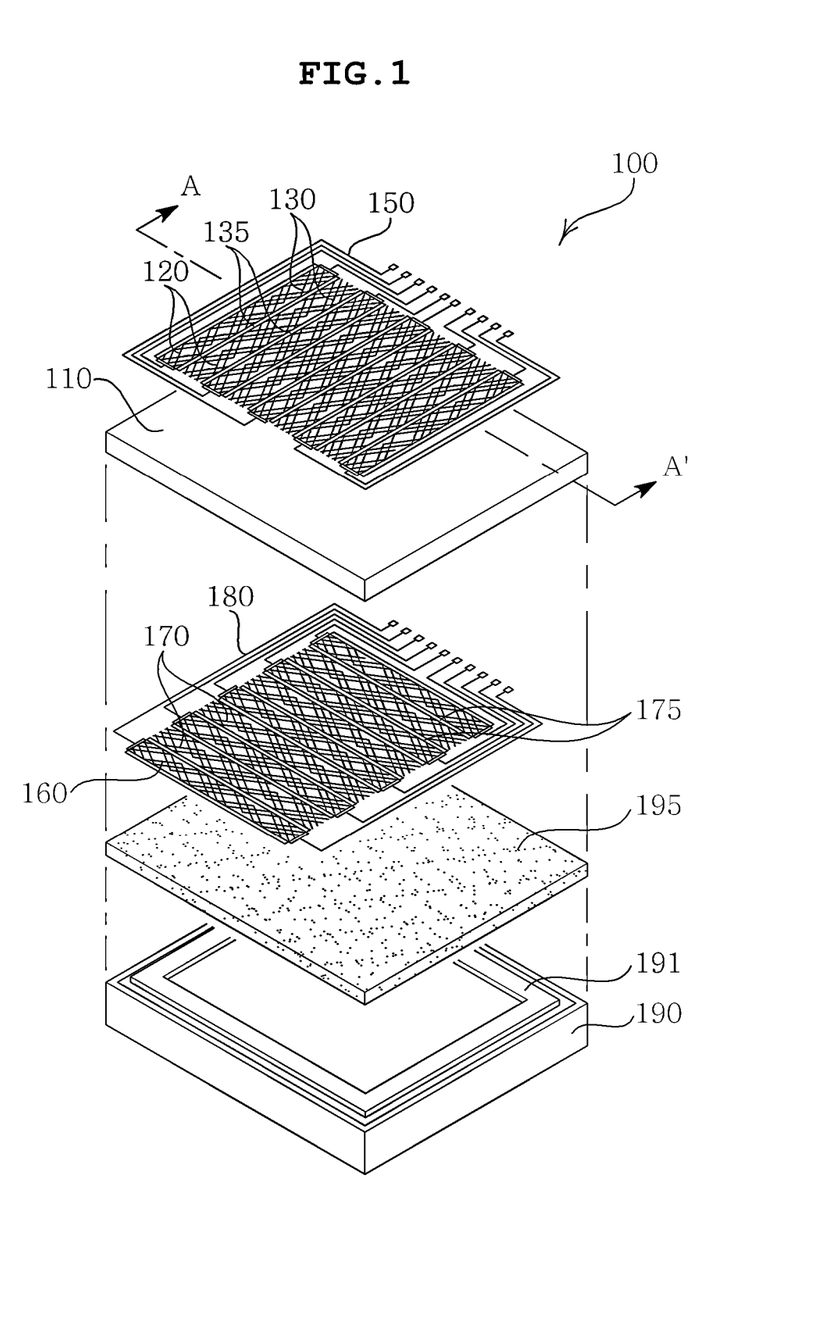
FIG. 1 is an exploded perspective view illustrating a touch sensor according to a preferred embodiment of the present invention.
Figure 2:
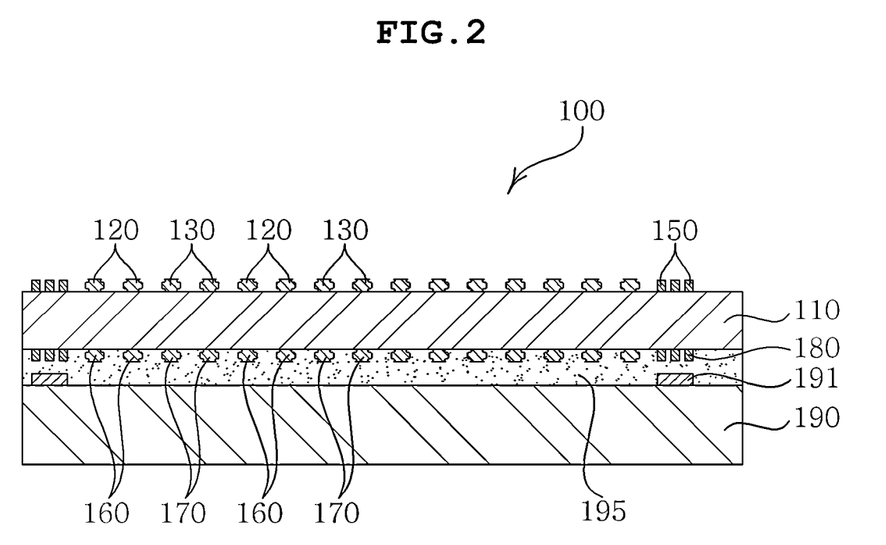
FIG. 2 is a transverse cross-sectional view illustrating a touch sensor according to a preferred embodiment of the present invention.

FIG. 1 is an exploded perspective view illustrating a touch sensor according to a preferred embodiment of the present invention and FIG. 2 is a transverse cross-sectional view illustrating a touch sensor according to a preferred embodiment of the present invention. In this case, FIG. 2 is a cross-sectional view of a touch sensor according to a preferred embodiment of the present invention taken along the line A-A' illustrated in FIG. 1.

As illustrated in FIGS. 1 and 2, a touch sensor 100 according to a preferred embodiment of the present invention is configured to include a transparent substrate 110 and electrodes 120 and 160 formed on the transparent substrate 110 in a mesh pattern.

The transparent substrate 110 serves to provide a region in which the electrodes 120 and 160 are formed. Herein, the transparent substrate 110 needs to have a support force capable of supporting the electrodes 120 and 160 and transparency to allow a user to recognize images provided from an image display device (not illustrated). In consideration of the support force and the transparency described above, the transparent substrate 110 may be made of polyethylene terephthalate (PET), polycarbonate (PC), poly methyl methacrylate (PMMA), polyethylene naphthalate (PEN), polyethersulpon (PES), a cyclic olefin polymer (COC), a triacetylcellulose (TAC) film, a polyvinyl alcohol (PVA) film, a polyimide (PI) film, polystyrene (PS), biaxially oriented polystyrene (BOPS; containing K resin), glass, or tempered glass, but the present invention are not necessarily limited thereto.

The electrodes 120 and 160 may include the first electrode 120 formed on one surface of the transparent substrate 110 in a mesh pattern and the second electrode 160 formed on the other surface of the transparent substrate 110 in a mesh pattern.

Further, the first and second electrodes 120 and 160 serve to generate signals when being touched by a user so as to allow a controller to recognize touched coordinates.

However, a part in which the first electrode 120 and the second electrode 160 that are electrodes according to the embodiment of the present invention are formed is not necessarily limited to one surface and the other surface of the transparent substrate 110. For example, the first and second electrodes 120 and 160 are each formed on one surface of the transparent substrate 110 or the transparent substrate 110 is configured of a first transparent substrate (not illustrated) and a second transparent substrate (not illustrated), such that the first electrode 120 and the second electrode 160 may be each formed on one surface of the first transparent substrate and one surface of the second transparent substrate, respectively.

Meanwhile, the electrodes 120 and 160 may be formed in a mesh pattern, including any one of copper (Cu), aluminum (Al), gold (Au), silver (Ag), titanium (Ti), molybdenum (Mo), nickel (Ni), and chromium (Cr). In this case, the first and second electrodes 120 and 160 may be formed by a plating process or a deposition process.

Further, the first and second electrodes 120 and 160 may have a line width of 7 μm or less and a pitch of 900 μm or less, such that the visibility may be improved so as to prevent the patterns from being visible. However, the line widths and the pitches of the electrodes 120 and 160 according to the embodiment of the present invention are not necessarily limited thereto.

Further, the thickness of the electrodes 120 and 160 may be 20 to 55 nm. For example, when the electrodes 120 and 160 are formed of silver (Ag), the thickness thereof may be 20 to 55 nm, when the electrodes 120 and 160 are formed of copper (Cu), the thickness thereof may be 25 to 55 nm, and when the electrodes 120 and 160 are formed of aluminum (Al), the thickness thereof may be 45 to 55 nm.

Further, in addition to the foregoing metals, the first and second electrodes 120 and 160 may also be formed of metal silver formed by exposing/developing a silver salt emulsion layer.

Meanwhile, in the touch sensor 100 according to the preferred embodiment of the present invention the line width of one side of the electrode is formed to be smaller than that of the other side of the electrode in a thickness direction of the electrodes 120 and 160, by etching. Therefore, the thickness of the electrodes 120 and 160 portions formed to have a small line width is reduced, such that the transmittance of light to the electrodes 120 and 160 is increased. Therefore, the visibility may be improved by preventing the patterns of the electrodes 120 and 160 from being visible. Herein, the thickness direction of the electrodes 120 and 160 may be a vertical direction of the electrodes 120 and 160 illustrated in FIG. 2. In this case, the electrodes 120 and 160 may have the line width of one side 85% smaller than that of the other side. In addition, the electrodes 120 and 160 may have, for example, the line width of one side 40 to 85% smaller than that of the other side, but the present invention is not limited thereto.

Figure 3:
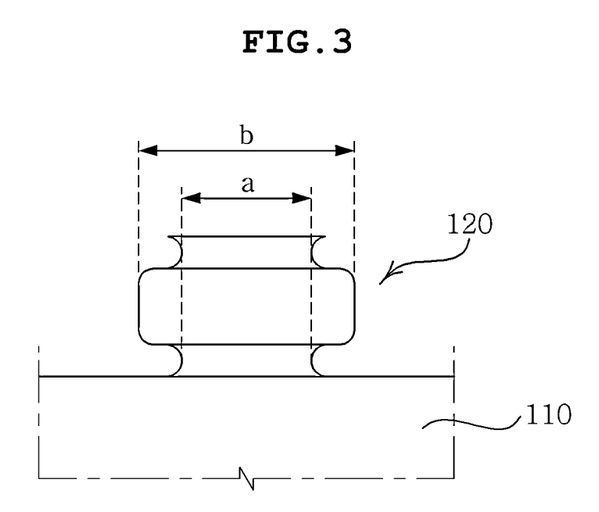
FIG. 3 is a transverse cross-sectional view illustrating a first example of an electrode in the touch sensor according to the preferred embodiment of the present invention.
Figure 4:
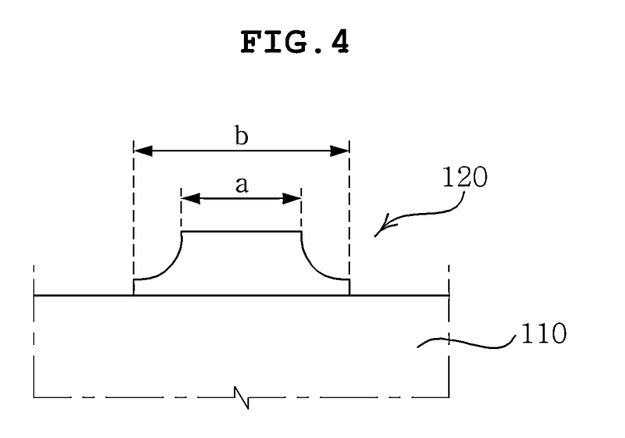
FIG. 4 is a transverse cross-sectional view illustrating a second example of the electrode in the touch sensor according to the preferred embodiment of the present invention.

FIG. 3 is a transverse cross-sectional view illustrating a first example of an electrode in the touch sensor according to the preferred embodiment of the present invention and FIG. 4 is a transverse cross-sectional view illustrating a second example of the electrode in the touch sensor according to the preferred embodiment of the present invention. Herein, FIG. 3 is a first example of an enlarged cross-sectional view of an electrode illustrated in FIG. 2 and FIG. 4 is a second example of an enlarged cross-sectional view of an electrode illustrated in FIG. 2.

Referring to FIGS. 3 and 4, the electrodes 120 and 160 may be formed in three layers, as the first example and the second example. Herein, in three layers of the electrodes 120 and 160, a line width of an upper layer positioned at an upper part and a lower layer positioned at a lower part may be smaller or larger than that of a central layer positioned at a center.

Further, the line width of the central layer of the electrodes 120 and 160 may have a difference of 15% or more from that of the upper and lower layers.

Further, materials of the upper and lower layers of the electrodes 120 and 160 are the same and materials of the central layer thereof may be different from the materials of the upper and lower layers.

Herein, the central layer of the electrodes 120 and 160 may be formed of at least any one of copper (Cu) and aluminum (Al). In this case, the upper and lower layers of the electrodes 120 and 160 may be formed of at least any one of titanium (Ti), nickel (Ni), molybdenum (Mo), and chromium (Cr). However, the materials of the upper layers, the central layers, or the lower layer of the electrodes 120 and 160 according to the preferred embodiment of the present invention are not limited thereto.

In more detail, referring to FIG. 3, as the first example, the electrodes 120 and 160 may have a line width a of the upper and lower layers smaller than a line width b of the central layer. In this case, the line width a of the upper and lower layers of the electrodes 120 and 160 may be 85% smaller than the line width b of the central layer. Herein, the electrodes 120 and 160 may have, for example, the line width a of the upper and lower layers 40 to 85% smaller than line width b of the central layer, but the present invention is not limited thereto. Further, both sides in a transverse direction (line width direction) of the upper and lower layers of the electrodes 120 and 160 may be depressed.

Further, referring to FIG. 4, as the second example, the electrodes 120 and 160 may have the line width b of the central layer smaller than the line width a of the upper and lower layers. In this case, the line width b of the central layer of the electrodes 120 and 160 may be 85% smaller than the line width a of the upper and lower layers.

Herein, both sides in the transverse direction (line width direction) of the upper and lower layers of the electrodes 120 and 160 may be depressed. Further, both sides in a transverse direction (line width direction) of the central layer of the electrodes 120 and 160 may be depressed.

Further, the total thickness of the electrodes 120 and 160 may be 65 nm or less and the thickness of the central layer of the electrodes 120 and 160 may be 20 to 55 nm. Herein, the total thickness of the electrodes 120 and 160 may be, for example, 25 to 65 nm, but the present invention is not limited thereto.

Figure 5:
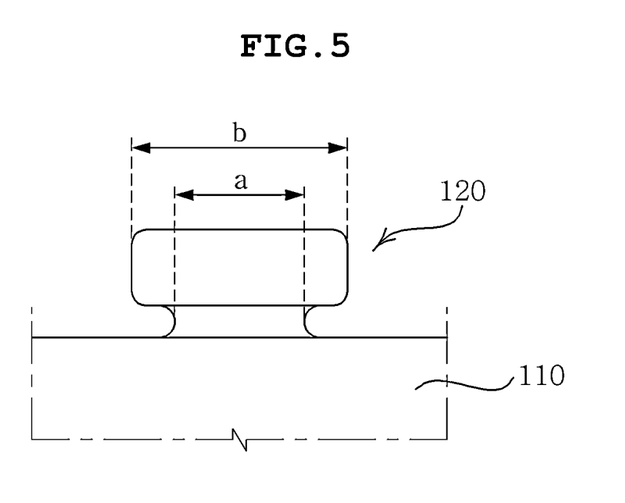
FIG. 5 is a transverse cross-sectional view illustrating a third example of the electrode in the touch sensor according to the preferred embodiment of the present invention.

FIG. 5 is a transverse cross-sectional view illustrating a third example of the electrode in the touch sensor according to the preferred embodiment of the present invention. Herein, FIG. 5 is a third example of an enlarged cross-sectional view of the electrode illustrated in FIG. 2.

Referring to FIG. 5, the electrodes 120 and 160 may be formed in two layers, as the third example. Herein, in two layers of the electrodes 120 and 160, the line width a of the lower layer positioned at the lower part may be smaller than the line width b of the upper layer positioned at the upper part. In this case, the line width a of the lower layer of the electrodes 120 and 160 may be 85% smaller than the line width b of the upper layer. Herein, the line width a of the lower layer of the electrodes 120 and 160 may be, for example, 40 to 85% smaller than the line width b of the upper layer, but the present invention is not limited thereto.

Further, both sides in the transverse direction (line width direction) of the lower layer of the electrodes 120 and 160 may be depressed.

Further, the total thickness of the electrodes 120 and 160 may be 65 nm or less and the thickness of the upper layer of the electrodes 120 and 160 may be 20 to 55 nm. Herein, the total thickness of the electrodes 120 and 160 may be, for example, 25 to 65 nm, but the present invention is not limited thereto.

However, the shape of the electrodes 120 and 160 of the touch sensor 100 according to the preferred embodiment of the present invention is not limited thereto. For example, in the two layers of the electrodes 120 and 160, the line width b of the upper layer positioned at the upper part may be smaller than the line width a of the lower layer positioned at the lower part.

Herein, the upper layer of the electrodes 120 and 160 may be formed of at least any one of copper (Cu) and aluminum (Al). In this case, the lower layer of the electrodes 120 and 160 may be formed of at least any one of titanium (Ti) or chromium (Cr). However, the materials of the upper and the lower layers of the electrodes 120 and 160 according to the preferred embodiment of the present invention are not limited thereto.

Figure 6:
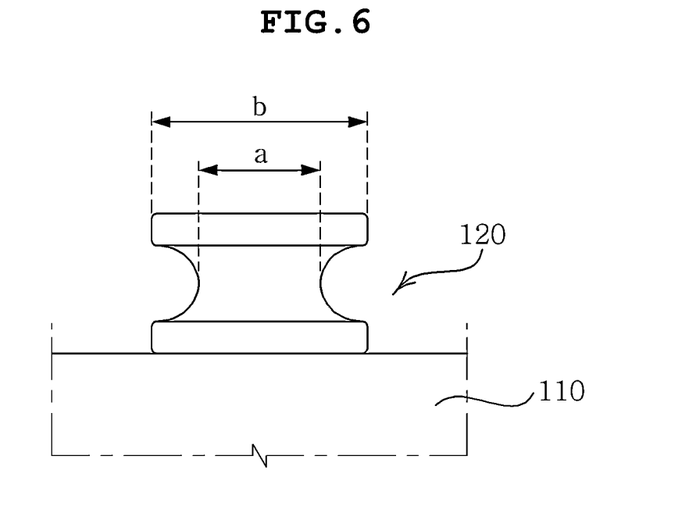
FIG. 6 is a transverse cross-sectional view illustrating a fourth example of an electrode in the touch sensor according to the preferred embodiment of the present invention.

FIG. 6 is a transverse cross-sectional view illustrating a fourth example of electrodes 120 and 160 in the touch sensor 100 according to the preferred embodiment of the present invention. Herein, FIG. 6 is a fourth example of an enlarged cross-sectional view of the electrodes 120 and 160 illustrated in FIG. 2.

Referring to FIG. 6, the electrodes 120 and 160 may be formed in a single layer, as the fourth example. Here, the electrodes 120 and 160 may have the line width a of the upper layer smaller than the line width b of the lower layer. In this case, the electrodes 120 and 160 may have the reduced line width toward the upper layer far away from the transparent substrate 110. In this case, the line width a of the upper layer of the electrodes 120 and 160 may be 85% smaller than the line width b of the lower layer. Herein, the electrodes 120 and 160 may have, for example, the line width a of the upper layer 40 to 85% smaller than the line width b of the lower layer, but the present invention is not limited thereto. Further, both sides in the transverse direction (line width direction) of the upper part of the electrodes 120 and 160 may be depressed.

Further, the total thickness of the electrodes 120 and 160 may be 65 nm or less and the thickness of the lower layer of the electrodes 120 and 160 may be 20 to 55 nm. Herein, the total thickness of the electrodes 120 and 160 may be, for example, 25 to 65 nm, but the present invention is not limited thereto.

However, the shape of the electrodes 120 and 160 of the touch sensor 100 according to the preferred embodiment of the present invention is not limited thereto. For example, in the single layer of the electrodes 120 and 160, the line width a of the upper layer positioned at the upper part may be smaller than the line width b of the lower layer positioned at the lower part.

Consequently, in the touch sensor 100 according to the embodiment of the present invention, the line width of a part (upper part, lower part, or central part) of the electrodes 120 and 160 is reduced, such that the visibility may be improved. As a result, it is possible to omit the separate process such as black-oxidizing the electrodes 120 and 160, and the like, so as to improve the visibility.

Further, referring to FIGS. 1 and 2, the touch sensor 100 according to the preferred embodiment of the present invention may further include dummy patterns 130 and 170 that are formed between the first and second electrodes 120 and 160 in a mesh pattern. In this case, insulating portions 135 and 175 that are spaced apart from each other may be formed between the first and second electrodes 120 and 160 and the dummy patterns 130 and 170. Here, the dummy patterns 130 and 170 may be cut so as to insulate the electrodes 120 and 160 that are formed in a mesh pattern.

Consequently, the transparent substrate 110 is formed in a mesh pattern and is provided with the insulating portions 135 and 175 that form a line in a plurality of columns or rows and a plurality of to parts partitioned by the insulating portions 135 and 175 are selectively connected with the electrode wirings 150 and 180. In this case, the electrode wirings 150 and 180 may be configured of a first electrode wiring 150 and a second electrode wiring 180.

Here, among the plurality of mesh patterns, a part which is selectively connected with the first electrode wiring 150 and the second electrode wiring 180 is configured of the first and second electrodes 120 and 160 and a non-selected part that is not connected with the first and second wirings 150 and 180 is configured of the dummy patterns 130 and 170. In this case, the first and second electrodes 120 and 160 and the dummy patterns 130 and 170 may be formed of the same material and the same pattern.

Therefore, the electrodes 120 and 160 having a wide line width form and the dummy patterns 130 and 170 in a floating state may be formed by forming an insulating line in the mesh pattern and connecting the first electrode wiring 150 with the second electrode wiring 180.

Therefore, it is possible to secure the spatial uniformity and improve the visibility and it may not be necessary to design the additional dummy patterns 130 and 170 so as to obtain the change in a linear touch signal.

Here, the dummy patterns 130 and 170 may be formed of the first dummy pattern 130 formed between the first electrodes 120 and the second dummy pattern 170 formed between the second electrodes 160.

Further, the dummy patterns 130 and 170 may be formed of the same or similar form and materials as or to various forms and materials of the above described electrodes 120 and 160.

Meanwhile, an edge of the first electrode 120 is provided with the first electrode wiring 150 that is supplied with an electrical signal from the first electrode 120 and an edge of the second electrode 160 is formed with the second electrode wiring 180 that is supplied with an electrical signal from the second electrode 160. In this case, the first electrode wiring 150 is integrally formed with the first electrode 120 and the second electrode wiring 180 is integrally formed with the second electrode 160, thereby simplify the manufacturing process and shorten lead time.

Figure 7:
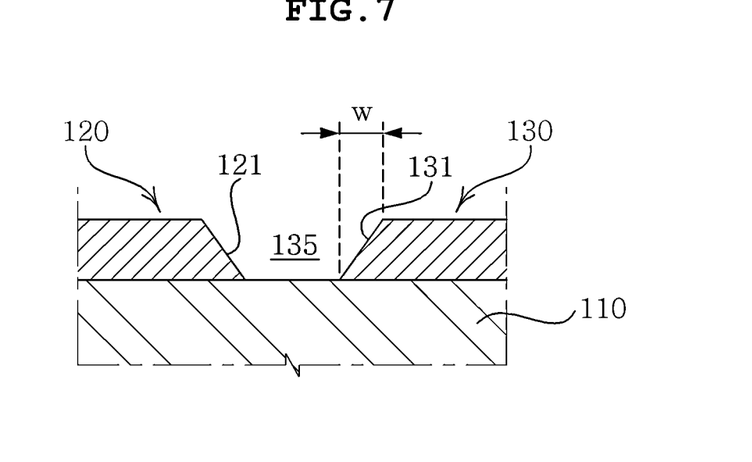
FIG. 7 is a longitudinal cross-sectional view illustrating an example of an inclined part in the electrode of the touch sensor according to the preferred embodiment of the present invention.
Figure 8:
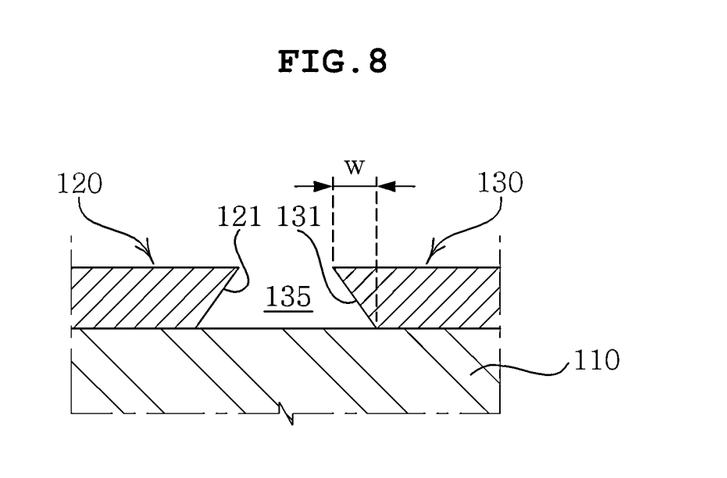
FIG. 8 is a longitudinal cross-sectional view illustrating another example of an inclined part in the electrode of the touch sensor according to the preferred embodiment of the present invention.
Figure 9:
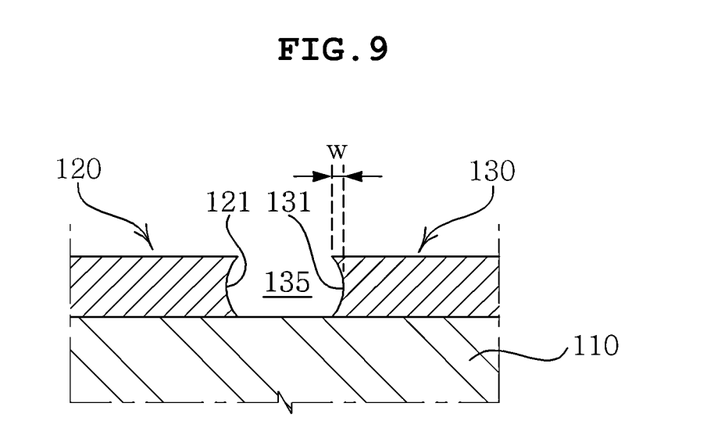
FIG. 9 is a longitudinal cross-sectional view illustrating still another example of an inclined part in the electrode of the touch sensor according to the preferred embodiment of the present invention.

FIG. 7 is a longitudinal cross-sectional view illustrating an example of an inclined part in the electrode of the touch sensor according to the preferred embodiment of the present invention, FIG. 8 is a longitudinal cross-sectional view illustrating another example of an inclined part in the electrode of the touch sensor according to the preferred embodiment of the present invention, and FIG. 9 is a longitudinal cross-sectional view illustrating still another example of an inclined part in the electrode of the touch sensor according to the preferred embodiment of the present invention.

Here, FIGS. 7 to 9 illustrate side cross sections of an example, another example, and still another example of the electrodes 120 and 160 and the dummy patterns 130 and 170 that are vertically cut along the longitudinal direction of the electrodes 120 and 160 and the dummy patterns 130 and 170.

Meanwhile, referring to FIGS. 7 to 9, the electrodes 120 and 160 and the dummy patterns 130 and 170 according to the preferred embodiment of the present invention have ends facing each other that are provided with inclined portions 121 and 131, thereby improving the visibility. In this case, a length width w of the inclined portions 121 and 131 may be 10 nm or less. Herein, the length width w of the inclined portions 121 and 131 may be, for example, 1 to 10 nm or less, but the present invention is not limited thereto.

In more detail, referring to FIG. 7, the electrodes 120 and 160 and the dummy patterns 130 and 170 according to the preferred embodiment of the present invention may be each provided with the inclined portions 121 and 131 of which the length is gradually reduced toward the upper part.

Further, referring to FIG. 8, the electrodes 120 and 160 and the dummy patterns 130 and 170 according to the preferred embodiment of the present invention may be each provided with the inclined portions 121 and 131 of which the length is gradually reduced toward the lower part, as another example.

Further, referring to FIG. 9, the electrodes 120 and 160 and the dummy patterns 130 and 170 according to the preferred embodiment of the present invention may be each provided with the inclined portions 121 and 131 of which the length is gradually reduced toward the central part, as another example. In this case, the central inclined portions 121 and 131 of the electrodes 120 and 160 and the dummy patterns 130 and 170 may be depressed.

Meanwhile, when the first and second electrodes 120 and 160 may be formed in a bar type pattern in the drawings, but the present invention is not limited thereto. Therefore, the first and second electrodes 120 and 160 may be formed in all the patterns known in the art such as a diamond pattern, a quadrangular pattern, a triangular pattern, a circular pattern, and the like.

Meanwhile, the touch sensor 100 according to the preferred embodiment of the present invention may further include a window 190 and an insulating layer 195 formed on one surface of the window 190. In this case, the transparent substrate 110 provided with the electrodes 120 and 160 may be formed one surface of the insulating layer 195.

Here, the insulating layer 195 may be formed of an inorganic material. Here, the inorganic material may include silicon dioxide $SiO_2$ or silicon alkoxide, but the inorganic material according to the preferred embodiment of the present invention is not limited thereto.

Further, a covering film 191 covering the first and second electrode wirings 150 and 180 may be formed on one surface of the window 190.

Here, when the first and second electrode wirings 150 and 180 may be formed of metals, such as silver paste, the covering film 191 is formed to prevent the first and second electrode wirings 150 and 180 from being visible from the outside. The covering film 191 may be formed by printing ink having low brightness such as black ink on one surface of the window 190.

According to the preferred embodiments of the present invention, it is possible to prevent the patterns from being visible by forming the electrode with the remarkably improved visibility. As a result, it is possible to omit the separate process such as black-oxidation treatment, and the like, so as to improve the visibility.

Further, according to the preferred embodiments of the present invention, the thickness of one side of the electrode is reduced in the thickness direction of the electrode, and therefore it is possible to prevent the pattern of the electrode from being visible, thereby improving the visibility.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch sensor, comprising:
   a transparent substrate; and
   an electrode formed on the transparent substrate in a mesh pattern,
   wherein the electrode has a line width of one side smaller than that of the other side in a thickness direction.

2. The touch sensor as set forth in claim 1, wherein the electrode has the line width of one side 85% smaller than that of the other side.

3. The touch sensor as set forth in claim 1, wherein the electrode has both ends of one side or the other side that are depressed.

4. The touch sensor as set forth in claim 1, wherein the electrode has a reduced line width as being away from the transparent substrate.

5. The touch sensor as set forth in claim 1, wherein the electrode is formed of two layers and has the line width of any one layer 85% smaller than that of another layer.

6. The touch sensor as set forth in claim 1, wherein the electrode is formed of three layers and has the line width of a central layer smaller than that of the upper and lower layers.

7. The touch sensor as set forth in claim 6, wherein the electrode has the line width of the central layer 85% smaller than that of the upper and lower layers.

8. The touch sensor as set forth in claim 1, wherein the electrode is formed of three layers and has the line width of the upper and lower layers smaller than that of the central layer.

9. The touch sensor as set forth in claim 8, wherein the electrode has the line width of the upper and lower layers 85% smaller than that of the central layer.

10. The touch sensor as set forth in claim 1, wherein a thickness of the electrode is 20 to 90% of a line width.

11. The touch sensor as set forth in claim 1, wherein the electrode is formed on at least any one of one surface or the other surface of the transparent substrate by plating or deposition.

12. The touch sensor as set forth in claim 1, wherein the electrode is formed of metal silver formed by exposing/developing a silver salt emulsion layer.

13. The touch sensor as set forth in claim 1, wherein the electrode is formed of at least any one of copper (Cu), aluminum (Al), gold (Au), silver (Ag), titanium (Ti), molybdenum (Mo), nickel (Ni), and chromium (Cr).

14. The touch sensor as set forth in claim 1, wherein the electrode is formed of three layers, and
   the central layer is formed of at least any one of copper (Cu) and aluminum (Al).

15. The touch sensor as set forth in claim 1, wherein the electrode is formed of three layers, and
   the upper and lower layers are formed of at least any one of titanium (Ti), nickel (Ni), molybdenum (Mo), and chromium (Cr).

16. The touch sensor as set forth in claim 1, wherein the electrode is formed of three layers,
   the upper and lower layers are formed of the same material, and
   the central layer is formed of materials different from the upper and lower layers.

17. The touch sensor as set forth in claim 1, wherein the electrode has the line width of one side smaller than that of the other side by etching.

18. The touch sensor as set forth in claim 1, further comprising:
   a dummy pattern formed between the electrodes in a mesh pattern.

19. The touch sensor as set forth in claim 18, further comprising:
   an insulating portion forming a space between the electrode and the dummy pattern.

20. The touch sensor as set forth in claim 19, wherein the electrode and the dummy pattern have ends facing each other that are each provided with an inclined portion of which the length has reduced toward the upper part, the lower part, or the central part.

* * * * *